L. S. CHADWICK.
CHAIN DRIVE ADJUSTMENT AND CASING FOR AUTOMOBILES.
APPLICATION FILED MAR. 24, 1908.
930,531.
Patented Aug. 10, 1909.
3 SHEETS—SHEET 1.
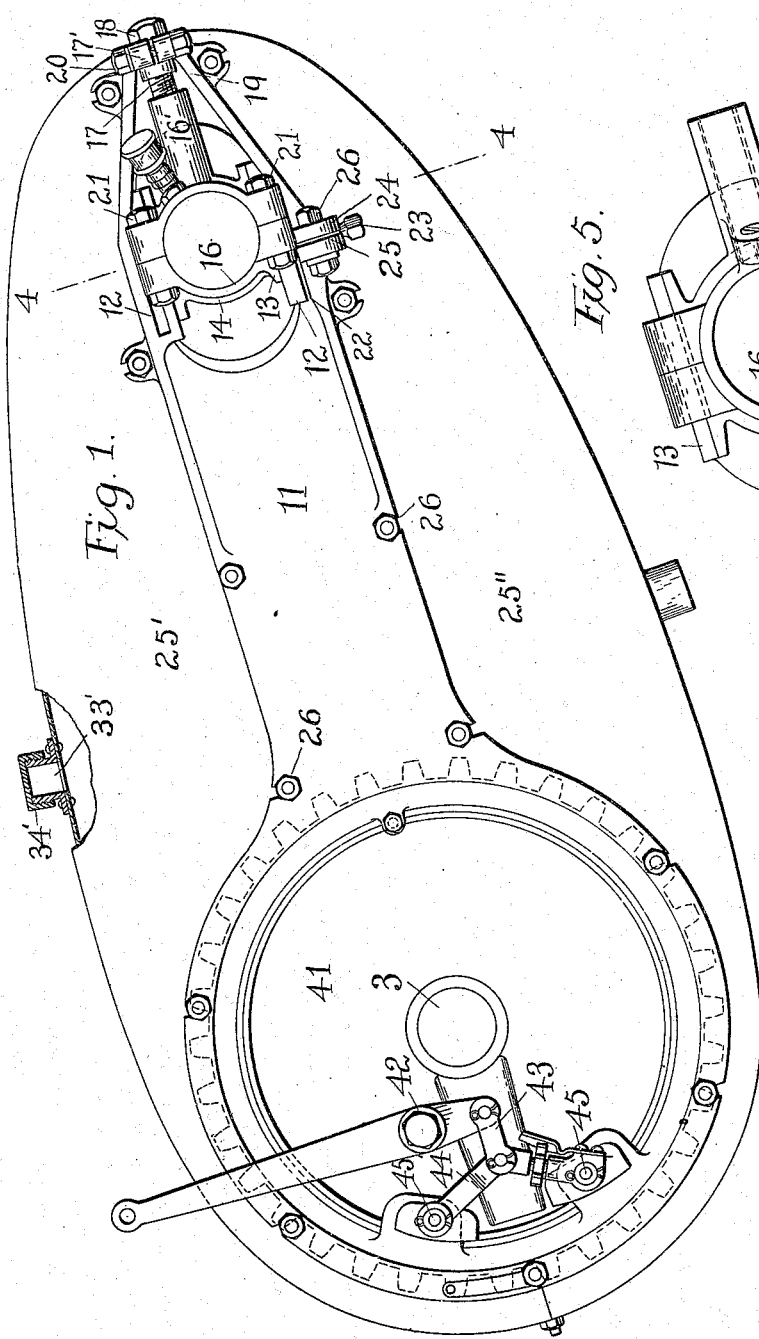
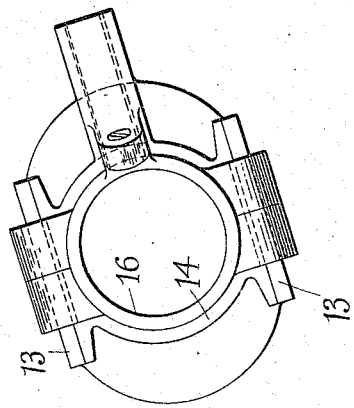

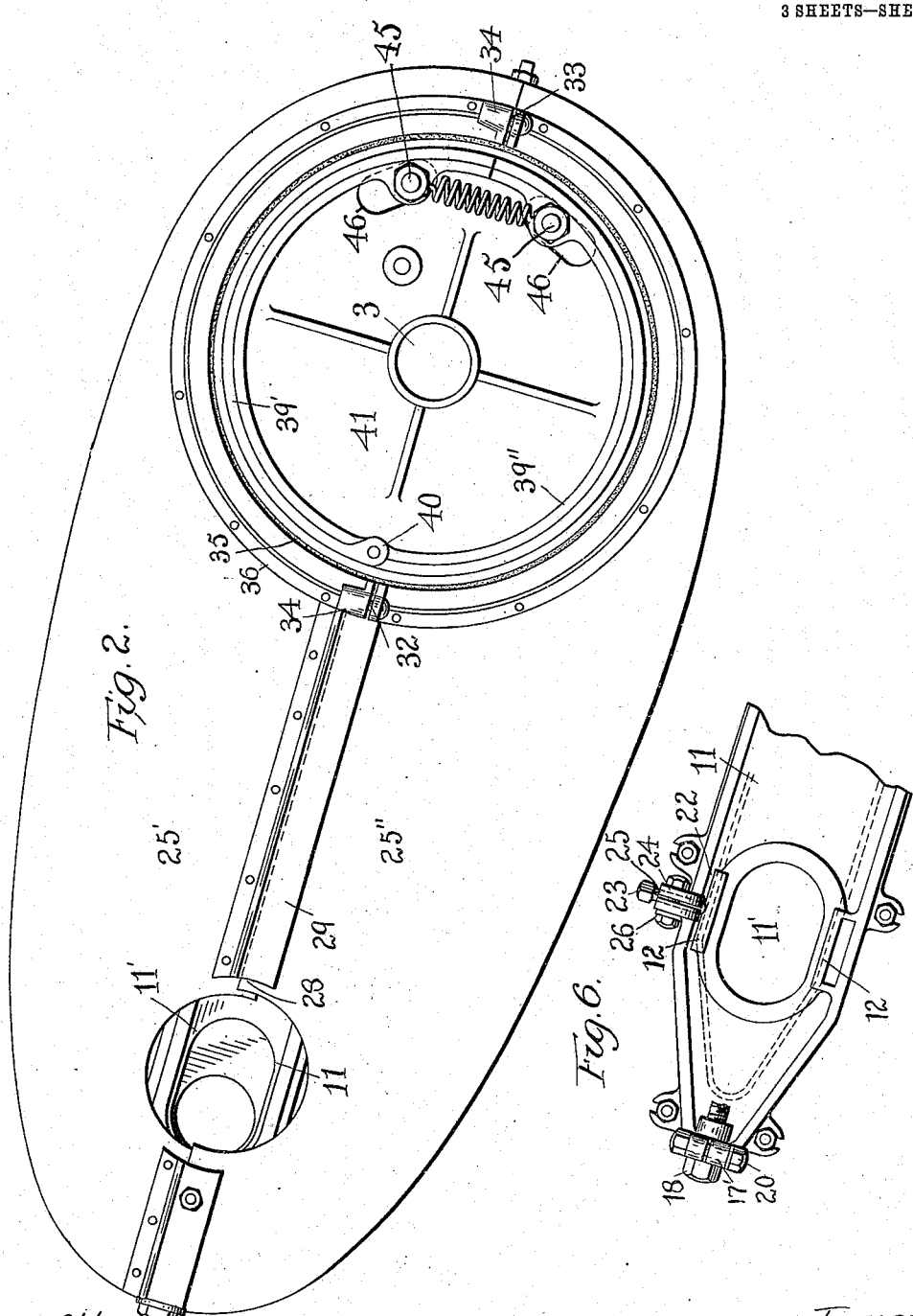

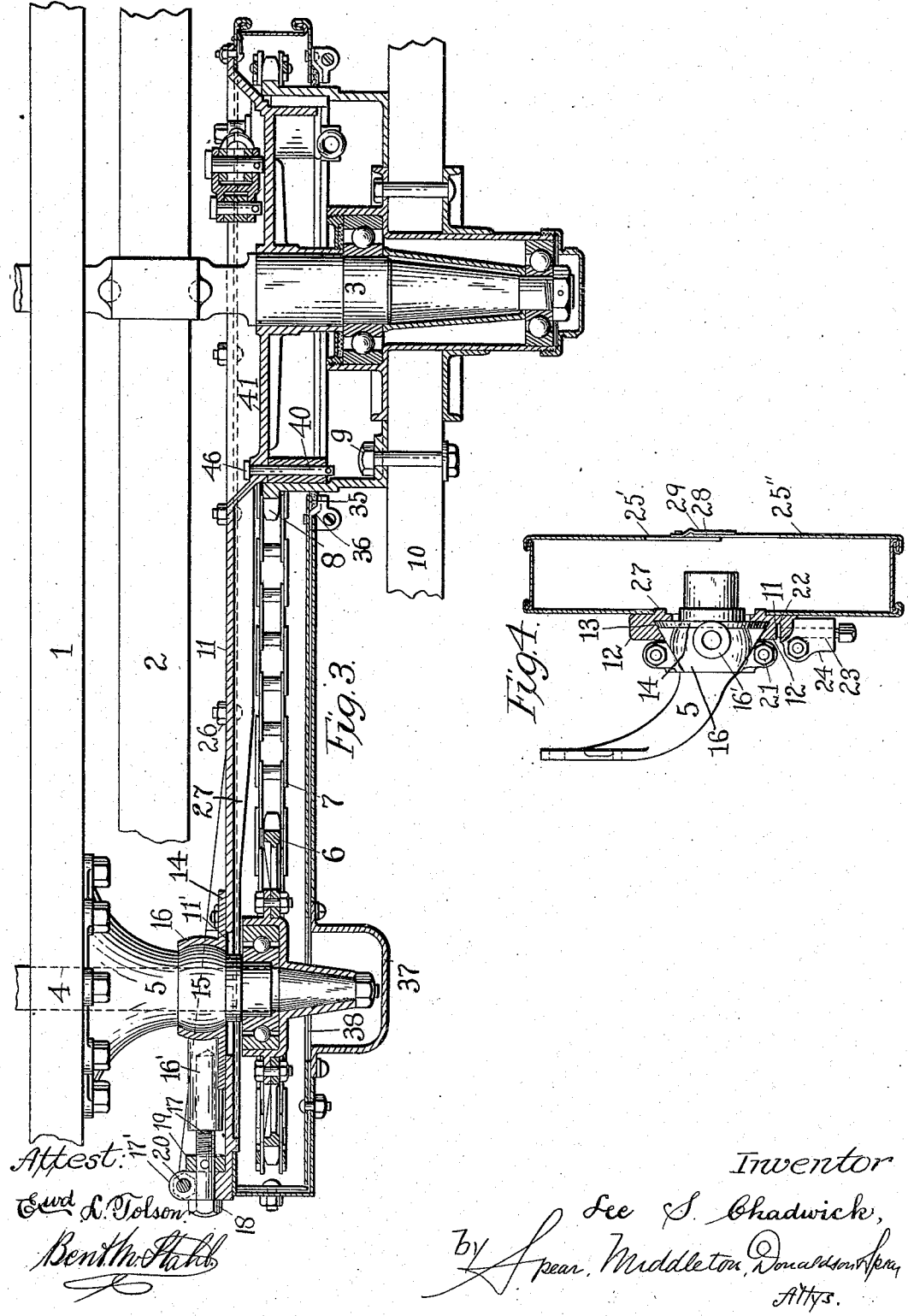

UNITED STATES PATENT OFFICE.

LEE S. CHADWICK, OF PHILADELPHIA, PENNSYLVANIA, ASSIGNOR TO CHADWICK ENGINEERING WORKS, OF PHILADELPHIA, PENNSYLVANIA.

CHAIN-DRIVE ADJUSTMENT AND CASING FOR AUTOMOBILES.

No. 930,531.      Specification of Letters Patent.      Patented Aug. 10, 1909.

Application filed March 24, 1908. Serial No. 422,892.

*To all whom it may concern:*

Be it known that I, LEE S. CHADWICK, citizen of the United States, residing at Philadelphia, Pennsylvania, have invented certain new and useful Improvements in Chain-Drive Adjustments and Casings for Automobiles, of which the following is a specification.

My invention relates to motor vehicles and particularly to an arrangement of chain drive having means whereby the chain may be readily adjusted.

The invention relates further to a construction and arrangement of chain casing which will protect the parts of the chain drive and will not require to be taken down or disturbed in adjusting the chain.

The invention consists in the features and combination and arrangement of parts hereinafter described and particularly pointed out in the claims.

In the accompanying drawings, Figure 1 is a side elevation of the invention, the view being of the side which faces inwardly or toward the machine frame. Fig. 2 is a similar view of the outer face of the parts constituting my invention. Fig. 3 is a longitudinal sectional view of the invention. Fig. 4 is a view substantially in the line 4—4 of Fig. 1. Figs. 5 and 6 are views of details.

In these drawings, 1 is a part of the side bar of the chassis of the machine.

2 indicates one of the supporting springs which has the usual pivoted link connection (not shown) with the frame. This spring forms the connection between the dead axle 3 and the frame.

The jack shaft is shown at 4 passing through a bearing bracket 5 attached to the frame 1. On this jack shaft the driving sprocket 6 is fixed about which the chain 7 passes, said chain passing also about the sprocket wheel 8 which is attached by bolts 9 to the rear wheel 10, and through these connections just described the car is driven from the jack shaft. Reaching from the jack shaft to the rear or dead axle 3 is what I term a radius bar 11 consisting of a metal bar having an opening at its rear end through which the axle 3 extends, said axle fitting the opening closely. The wheel 10 is journaled on the portion of the dead axle which projects through the radius bar.

The front end of the radius bar or reach is provided with an opening at 11′ through which the jack shaft projects, said opening being elongated, as shown in Figs. 2 and 3 to permit the radius bar to have movement of adjustment in respect to the jack shaft and its bracket for the purpose of adjusting the chain as will presently appear. The radius bar is provided on its inner face, or the face next to the chassis with parallel ribs 12 which furnish V shaped guide ways to receive correspondingly shaped flanges 13 of a block plate 14 which is associated with or supported on the bearing bracket 5 of the jack shaft. This bearing bracket has a spherical enlargement at 15 and the block or plate 14 has thereon a similarly shaped shell or cup 16 fitted to the spherical part 15 of the bracket. This provides in effect a universal joint connection between the fixed bearing bracket 5 of the jack shaft and the radius bar, so that as the dead axle changes its position in relation to the chassis frame, due to the resiliency of the spring, the radius bar may accommodate itself to the changed relation of the parts by tipping either longitudinally or laterally, or both, as the occasion demands, the shell 16 simply turning on the spherical enlargement of ball 15 for this purpose.

As before stated, the chain wheels are located at the jack shaft and rear axle respectively, and for adjusting the chain it is simply necessary to move the radius bar longitudinally so as to set the rear axle farther from or closer to the jack shaft, it being borne in mind that the rear axle fitting closely in the rear part of the radius bar will move toward the front or rear in accordance with the adjustment of the radius bar. For effecting this adjustment the block or plate 14 supported on the jack shaft bracket has an internal screw threaded socket piece or boss 16′ receiving an adjusting screw 17 extending lengthwise of the radius bar, and passing through an ear 17′ at the extreme end of the radius bar said adjusting screw having a head 18 by which it may be turned and having also fixed thereto, a collar 19 which together with the head on the screw holds the screw against longitudinal movement by bearing upon opposite sides of the ear 17′. It will now be clear that by turning the adjusting screw or bolt it will move inwardly or outwardly in respect to the threaded boss or socket 16′ and as this is a relatively fixed point, at least so far as the longitudinal dimension of the radius bar is concerned, the radius bar itself will be moved forwardly or backwardly and thus move the rear axle together with the rear sprocket toward or from the jack shaft and its sprocket and thus the chain will be tightened or loosened as the case may be.

The adjusting means comprising the screw is at the extreme end of the radius bar and toward the front in respect to the chain drive. It is therefore readily accessible for adjustment and in the movement of the radius bar it is controlled and guided by the ways 12, 13, maintaining in all positions its supporting connection with the block 14 and the spherical bearing 15 therein.

The ear 17' through which the adjusting screw or bolt passes is split and these split portions may be drawn together by the bolt 20 so as to clamp the bolt in any position in which it may be turned. The spherical cup or shell 16 and the plate or block 14 are formed in sections as shown in Fig. 1, said sections being held together about the enlargement or spherical portion 15 of the jack shaft bracket by means of bolts 21. One of the guide ribs 12 is provided with a slot 22 cut therein so that this guide rib may have a certain amount of adjustment, the metal thereof yielding at this point of connection with the main body of the plate in order to make this adjustment which is effected by means of a screw 23 passing through an ear 24 formed on the radius bar. This ear is split at 25 and this split portion may be drawn together by a bolt 26 so as to clamp the adjusting screw 23 securely in place. By means of this adjusting screw the guideway 12 at one side of the block 14 may be adjusted to take up wear and to hold the block 14 and the radius bar in firm though adjustable contact to prevent rattling at this point. It will be seen from the above that the radius bar is firmly supported upon the jack shaft though it is permitted to have adjustment automatically both longitudinally and laterally to accommodate itself to the varying relations between the rear axle and the frame, due to the yielding of the spring connecting these parts and in adjusting the chain drive the radius bar is adjusted as a whole in relation to the jack shaft and thus increases or diminishes the distance between the sprocket on said jack shaft and that which is connected with the rear wheel. I do not of course limit myself to the use of a dead axle as the other well known form of drive may be employed in which the sprocket wheel is connected with the live axle at the rear.

In order to protect the chain and sprocket I provide a chain casing which is carried bodily by the radius bar and is adjustable as one body therewith. This chain casing is formed of light material, such as aluminum, in two sections, each section extending longitudinally from end to end of the radius bar. These sections are indicated at 25' 25" and on their inner sides or the sides which are next to the frame of the machine they are each secured to the radius bar by means of bolts and nuts at 26. The radius bar is preferably formed with a rib 27 on its outer face to afford a bearing for the edges of the sections of the casing. The outer sides of the sections of the casing are adapted to interlock with each other as shown at 28, for which purpose the upper section of the casing is provided with a depending flange 29 secured thereto, forming a space between itself and the main portion of the side of this section, in which space the upper edge of the outer side of the lower section of the casing fits. The outer portions of the upper and lower sections of the casing are held at the points 32, 33, by screws or fastening devices passing through ears 34 on the sections. It will be observed that while the chain casing is wholly supported by the radius bar and completely incloses the sprocket wheels and the chain, the adjusting devices for the radius bar are located wholly outside of the chain casing and are thus accessible at all times without disturbing in any way the chain casing in relation to the radius bar upon which it is supported. I provide openings in the upper and lower parts of the chain casing for the introduction and removal of lubricating material, these openings being provided with nipples 33' which are closed by caps 34' screwed thereon.

At the point where the shell of the sprocket wheel 8 passes out through the front of the chain casing, I provide a flexible or yielding packing strip 35 held between the shell of the casing and a ring or strip 36 riveted thereto, the edge of this material bearing upon the barrel of the sprocket wheel to make a tight joint at this point to exclude dust, and for a similar purpose I provide a cap 37 secured about the opening 38 through which the end of the jack shaft 5 projects. The chain and sprockets are thus completely protected.

I utilize the radius bar or reach as a support for the brake mechanism. This brake mechanism may be of any ordinary form and I have shown as one way of carrying out this part of my invention a brake member which may consist of two sections 39' 39" pivotally supported at 40 to the enlarged or circular rear head or portion 41 of the radius bar. The sections of the brake member may be forced outwardly to bear upon the interior of the sprocket wheel or shell by means of a lever pivoted to the head of the radius bar at 42 and connected by a link 43 with toggle arms 44, which are pivotally connected to studs or bolts 45, which pass through slots 46 formed in the head of the radius bar, the said bolts or pins being connected with the sections of the brake member. It will be observed that the head or enlarged portion of the radius bar is of dished or concaved formation on its inner face and that the lever and toggle connections are located in the recess, thus provided, while the brake is arranged on the outer face of the head of the radius bar, the connections between the operating means and the brake extending through the slots before mentioned in the head of the radius bar.

I do not limit myself to any particular form of brake as this in itself forms no part of my invention, but my invention here resides broadly in the utilization of the radius bar as a support for the brake mechanism.

I claim:

1. In combination with the frame the axle and the jack or driving shaft and the chain, and sprocket connections between them, a radius bar extending radially from the axle to the said shaft, a bracket through which the driving shaft passes, and means for supporting the radius bar from, and adjusting the same longitudinally in relation to, the said bracket, said radius bar having a connection with said bracket sliding in a direction longitudinally of the radius bar substantially as described.

2. In combination in a motor vehicle, a frame, the jack shaft and axle, the chain and sprocket wheels, a bar extending from the axle, a support for the front end of the said bar carried by the frame and a sliding and swivel connection between the front end of the said bar and its support with means for adjusting said bar in relation to the said support, substantially as described.

3. In combination with the frame, the jack or driving shaft and the axle, the chain and sprocket wheels, a supporting bracket attached to the frame and through which the jack shaft passes, a bar extending from the axle and having a sliding and swivel connection with the said supporting bracket and means for adjusting the bar in relation to the supporting bracket, the sliding connection enabling the bar to be adjusted longitudinally and the swivel connection allowing for lateral turning movement of the bar on said support substantially as described.

4. In combination with the jack shaft and axle, a bracket through which the jack shaft extends, the sprocket wheels and chain connection, a bar extending from the axle to the jack shaft, the said bracket having a spherical enlargement, a block or plate having a cup shaped member to engage the said spherical portion having sliding connection on the bar, and means for adjusting the bar longitudinally with said sliding connection to loosen or tighten the chain, substantially as described.

5. In combination, a drive or jack shaft, the rear axle, the sprocket wheels, the chain connection between them, a bar extending from the axle to the drive shaft, a supporting bracket, a block having swivel connection with said supporting bracket and an adjusting screw or bolt passing through a portion of the bar and engaging a portion of the block, substantially as described.

6. In combination with the driving or jack shaft and the axle, the sprocket wheels and chain, a radius bar extending from the axle, a support at the front end of the said radius bar having a swivel and sliding connection therewith, means for slidably adjusting the radius bar in relation to the said support and in a direct line with the centers of the jack shaft and axle and a chain casing supported on the radius bar, and maintaining its longitudinal axial relation to the frame and radius bar in all adjustments substantially as described.

7. In combination, the driving or jack shaft, the axle, the sprocket wheels and chain, the radius bar extending from the axle, a supporting block, said radius bar having slideways thereon engaging the said block, one of the slideways being adapted to be sprung in relation to the block, means for adjusting the radius bar and means for adjusting the slideway, substantially as described.

8. In combination with the jack or driving shaft, the axle, a radius bar or reach extending between them, the sprocket wheels, a chain and brake mechanism supported on the radius bar, and means for adjusting the radius bar in relation to the jack shaft the axle and brake mechanism maintaining their relative positions in all adjustments of the radius bar substantially as described.

9. In combination the driving or jack shaft, the rear axle, the chain and sprocket wheels, driving connections, a radius bar extending from the rear axle to the drive shaft, a brake member supported on one side of the said radius bar and operating means arranged upon the other side of the radius bar and connected with the brake member through an opening in the radius bar, substantially as described.

10. In combination with a jack shaft and axle and the chain and sprocket drive, a radius bar extending from the axle to the jack shaft having a recess on its inner face, a brake member on the outer face of said radius bar, and operating means for the brake member located on the recessed face of the radius bar and connected with the brake member through an opening in the radius bar, substantially as described.

In testimony whereof I affix my signature in presence of two witnesses.

LEE S. CHADWICK.

Witnesses:
E. R. McCleese,
Fredk C. Eberhardt.